Sept. 24, 1935.                N. SINGER                2,015,241
OPHTHALMIC LENS
Original Filed July 18, 1933

INVENTOR.
Nathaniel Singer.
BY
ATTORNEYS.

Patented Sept. 24, 1935

2,015,241

UNITED STATES PATENT OFFICE 2,015,241

OPHTHALMIC LENS

Nathaniel Singer, New York, N. Y., assignor to Optical Research Corporation, New York, N. Y., a corporation of New York Original application July 18, 1933, Serial No. 681,000. Divided and this application May 6, 1935, Serial No. 20,007

2 Claims. (Cl. 88—54)

My invention relates to ophthalmic lenses. It has to do primarily with single vision lenses, though it is capable of application to multifocal lenses as well.

In the prior art, numerous efforts have been made to produce special purpose lenses effective to protect the eyes from abnormally bright rays of light. Among these lenses are those types which possess special colored areas of a relatively opaque nature located to protect the eyes from overhead lights or from lights at the side such as from an approaching automobile or the like. Some effort has been made to provide lenses wherein the visual field is completely surrounded by a relatively opaque area but these efforts have been of such a nature as to unduly restrict the actual vision area of clear glass.

One of the objects of this invention is to provide ophthalmic lenses having an amply large visual area centrally disposed and, at the same time, to provide a means for protecting the eyes from such light rays as strike the outer edges of the lens, eliminating glare and removing the glitter that makes for eye discomfort.

Another object of this invention is to provide such a lens as will afford ample protection of the eyes from light rays which may strike upon or adjacent to the edges of the lens while, at the same time, affording an actual visual area which is adequately extensive in all directions.

Another object of this invention is to provide a lens that may be made by a simple method which will permit of the production of the lens at a much lower cost, while at the same time maintaining the quality of the lens on a parity with present day quality.

In its preferred embodiment, the ophthalmic lens which I have devised comprises a visual area of clear uncolored glass which is of a size corresponding approximately to the area of the lens commonly prescribed in present day practice. This visual area is surrounded by a relatively small area of glass of selected color which is fused thereto but which is of such a nature as to absorb the light rays sufficiently to adequately protect the eyes from the glare resulting from the striking of these light rays upon or adjacent to the edges of the lens.

The method which I preferably use in making my lens comprises providing a main blank with a central area approximating the size of the visual area to be obtained and a surrounding area of less thickness than the central area. Upon this surrounding relatively thin area, I superimpose a ring of glass which has greater light absorptive properties than the central area and which will protect the central area.

This application is a division of my co-pending application Serial No. 681,000, filed July 18, 1933 and which has become Patent No. 2,002,719, dated May 28, 1935.

Several types of ophthalmic lenses which may be produced in accordance with my invention are shown in the accompanying drawing wherein similar characters of reference designate corresponding parts and wherein.

Figure 1:
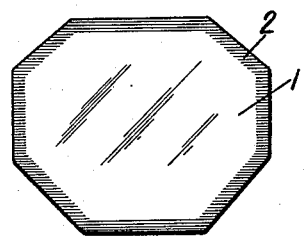
Figure 1 is a plan view of one type of lens made in accordance with my invention.
Figure 2:
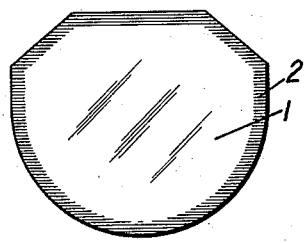
Figure 2 is a plan view of a lens of a somewhat different perimetric shape but having a substantially similar visual area.
Figure 3:
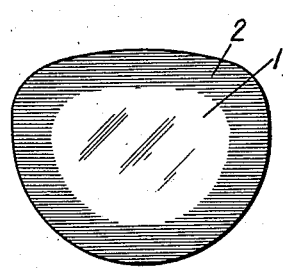
Figure 3 is a plan view of a lens having a still different perimetric shape with a drop-oval visual field.
Figure 4:
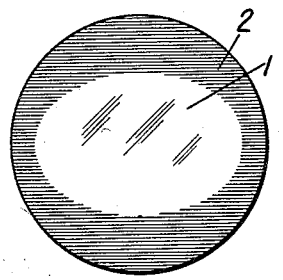
Figure 4 is a plan view of a lens of a circular form with a still different form of visual area.

In the drawing, referring particularly to Figures 1 to 4 inclusive, the lens is shown as having a central area of white glass as at 1. This area of white glass constitutes the visual area of the lens and it will be noted that it is amply large to provide a full visual field. As indicated, it may vary as to form to any desired extent.

It will be seen that this visual field is surrounded by a shaded area 2 which may be tinted or colored or which may otherwise have imparted thereto higher light absorptive properties.

Figure 5:
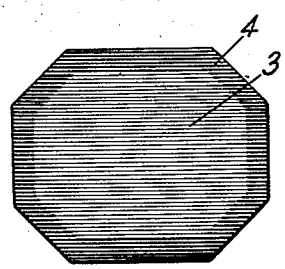
Figure 5 is a plan view of a lens wherein the visual area is of one tint while the surrounding area is of a still different tint.
Figure 6:
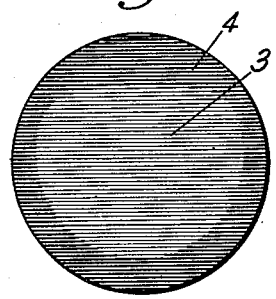
Figure 6 is a plan view of a circular lens wherein the visual field is of one tint while the surrounding area is of a still different tint, the visual area being of somewhat different form from that shown in Figure 5.
Figure 7:
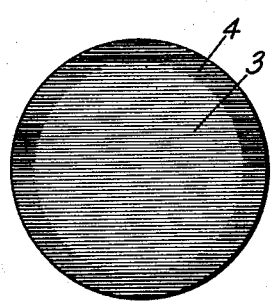
Figure 7 is a plan view of a circular lens wherein the visual field is shown as being of one tint while the surrounding area is of a still different tint, the visual area being of somewhat different form from those shown in Figures 5 and 6.

In the forms shown in Figures 5, 6 and 7, the visual area is indicated at 3 and, as indicated by the shading, it may be slightly tinted. In these forms, also, it will be noted that the central area is amply large to provide a full area of vision.

In those forms shown in Figures 5, 6 and 7, the surrounding area is also tinted or colored as indicated at 4 or it is otherwise given higher light absorptive characteristics.

It will be understood that lenses made in accordance with my invention may have a visual area which is entirely white while the outer area may be of a light or mild tint or of a medium or darker shade if desired. On the other hand, the central zone may be a light or other tint with the outer area a medium or darker tint. As a matter of fact, the central zone may be a light or darker tint and the outer area a white or lighter tint with the glass thereof of such a nature that it will have higher light absorptive properties than the glass in the central zone.

The dividing wall between the two zones of my lens may be at right angles to the surface of the lens and preferably provides a sharp line of demarcation between the zones. However, one zone may shade into the other and, if desired, the dividing wall may be at less or more than a right angle to produce a bevelled surface so that the change from one area to the other will be gradual or blended.

It will also be understood that the lens may be made by fusing a plurality of pieces of glass together, the glass of the central zone preferably having a similar index of refraction to the glass of the surrounding zone and both preferably having similar dispersive properties, the light absorptive properties being accentuated by the different color characteristics. On the other hand, though the glasses used in the two different zones preferably have similar indices of refraction, they may have different dispersive properties so that the glass in the outer zone possesses higher light absorptive characteristics.

It will also be understood that my invention is applicable to lenses of various types. For example, it is applicable to flat lenses, spherical lenses or toric lenses of any form.

Figure 8:
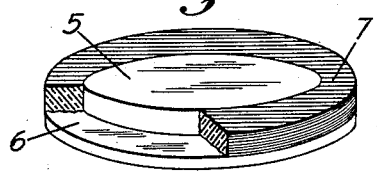
Figure 8 is a perspective view, partly broken away, illustrating a method by which my lens may be made.

In Figure 8 I illustrate how my lens may be made by fusing a plurality of pieces of glass together. In this figure I show a blank, the main portion of which comprises a central area 5 approximating the size of the visual area to be obtained and a surrounding area 6 of more or less annular form which is of less thickness than the central area 5. Upon this surrounding relatively thin area 6 may be superimposed a ring 7 of glass of darker tint or color or of higher light absorptive characteristics. This ring of glass 7 may then be fused to the underlying area of glass of the blank so as to produce a fused lens structure having an inner visual area and an outer surrounding area having relatively high light absorptive characteristics.

It will be understood that in the preceding description and in the appended claims where I state that a "ring" of colored glass is superimposed on a thin portion of the main blank, that I also intend to cover border portions of colored glass which are not of annular form but which may be applied in the same manner and the "ring" need not completely surround the lens but may extend substantially around it and will adequately protect the visual area.

It will be apparent that, with my lens, marginal reflection, which is bound to be detrimental to distinct vision with regard to contrast between light and shade is practically eliminated. It is a well known fact that strong light rays reaching the lens at its edge, enter through the edge of the lens and travel by internal reflection throughout the lens. These rays traveling throughout the lens interfere considerably with vision through the lens and are detrimental to visual acuity. However, with my lens, due to the fact that a border of high light absorptive characteristics is provided, the strong light rays striking the margin of the lens will be absorbed for the most part by the said border. Thus, distinct vision regarding contrast between light and shade will be ensured.

It will be seen from this that I have provided a novel type of lens which will protect the eye from the light rays striking upon and adjacent to the edge of the lens by reducing the intensity of the light rays passing to the retina of the eye from these areas of the lens. At the same time, the normal visual area of the lens is unrestricted. Obviously, the light absorptive properties of the outer area of the lens may be increased or reduced in the making of the lens to properly fit it for the conditions under which it is to be used, this being also true as to the inner visual area of the lens. Various other modifications will be apparent from the above description and from the appended claims.

Having thus described my invention, what I claim is:

1. A fused ophthalmic lens made from a plurality of pieces of optical glass of different light absorptive properties, said lens comprising a main portion of glass which is transparent and which has a central portion of sufficient area that direct vision normally will occur therethrough and which is surrounded by an area of glass of less thickness than said central portion, a ring of glass which is transparent and through which vision may occur but which has inherently in the glass thereof higher light absorptive properties than the glass of said central portion superimposed and fused on the area of glass which surrounds said central portion and which is of less thickness than the central portion, the ring of glass surrounding said central portion and protecting it from strong rays of light striking upon or adjacent the edge of the lens, the top surface of the ring of glass being a continuation of the corresponding surface of said central portion.

2. A fused ophthalmic lens made from a plurality of pieces of optical glass of different light absorptive properties, said lens comprising a main blank of glass having pre-selected light absorptive properties and being transparent, a ring of glass, which is transparent but which has inherently in the glass thereof higher light absorptive properties than the glass of said main blank, superimposed and fused on said main blank adjacent the edge thereof, the ring of glass having such an inside diameter that the portion of the main blank within the ring is of such an extent that direct vision normally will occur therethrough, said ring forming a surrounding border of glass through which vision might occur but which is of higher light absorptive properties than the glass of the main blank, the top surface of the ring of glass being a continuation of the corresponding surface of said main blank, and the ring of glass extending only partly through the total thickness of the lens at the edge thereof.

NATHANIEL SINGER.